United States Patent
Chung et al.

(10) Patent No.: US 7,751,710 B2
(45) Date of Patent: Jul. 6, 2010

(54) PHOTONIC CROSS-CONNECTOR SYSTEM, WDM SYSTEM USING THE SAME PHOTONIC CROSS-CONNECTOR, AND OPTICAL COMMUNICATION NETWORK BASED ON THE SAME WDM SYSTEM

(75) Inventors: Hwan Seok Chung, Daejeon (KR); Sun Hyok Chang, Daejeon (KR); Sang Soo Lee, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 506 days.

(21) Appl. No.: 11/745,565

(22) Filed: May 8, 2007

(65) Prior Publication Data

US 2008/0080861 A1    Apr. 3, 2008

(30) Foreign Application Priority Data

Sep. 29, 2006   (KR) .................. 10-2006-0096456

(51) Int. Cl.
*H04J 14/00* (2006.01)
(52) U.S. Cl. .......................... 398/68; 398/48
(58) Field of Classification Search ............ 398/48, 398/49, 50, 51, 55, 56, 57, 68
See application file for complete search history.

(56) References Cited

U.S. PATENT DOCUMENTS

| 6,233,074 | B1 | 5/2001 | Lahat et al. | |
|---|---|---|---|---|
| 6,947,628 | B1 | 9/2005 | Peng et al. | |
| 2002/0186432 | A1* | 12/2002 | Roorda et al. | ............... 359/128 |
| 2003/0002104 | A1 | 1/2003 | Caroli et al. | |

FOREIGN PATENT DOCUMENTS

| KR | 1020000018258 | 4/2000 |
|---|---|---|
| KR | 1020060062576 | 6/2006 |
| WO | WO 02/075369 | 9/2002 |

OTHER PUBLICATIONS

Korean Notice of Patent Grant dated Feb. 21, 2008 for the corresponding application KR 10-2006-0096456.
Emmanuel Tanguy et al, "A Layered Dynamic Emotion Representation for the Creation of Complex Facial Expressions", University of Bath, 2003.

(Continued)

*Primary Examiner*—Nathan M Curs
(74) *Attorney, Agent, or Firm*—Ladas & Parry LLP (57) ABSTRACT

Provided are a photonic cross-connector system, a wavelength division multiplexing (WDM) system using the photonic cross-connector system, and an optical communication network based on the WDM system. The photonic cross-connector system includes: an optical coupler branching an input optical signal into a plurality of paths; a wavelength selective switch (WSS) extracting at least one wavelength signal from the input optical signal and outputting the extracted wavelength signal to at least one port; a WDM multi-casting apparatus simultaneously copying and reproducing the input optical signal into different wavelengths and changing modulation methods of the input optical signal into different types of modulation methods; an optical transmitter and/or receiver branching and coupling the input optical signal; and a control system controlling the optical coupler, the WSS, the WDM multicasting apparatus, and the optical transmitter and/or receiver.

20 Claims, 10 Drawing Sheets

OTHER PUBLICATIONS

Zhong Pan et al, "Demonstration of an Optical-Label Switching Router with Multicast and Contention Resolution at Mixed Data Rates" IEEE Photonics Technology Letters, vol. 18, No. 2, Jan. 15, 2006.

George N. Rouskas, "Optical Layer Multicast: Rationale, Building Blocks, and Challenges", IEEE Network Jan./Feb. 2003.

Jingyu Zhou et al, "Crosstalk in Multiwavelength Optical Cross-Connect Networks", Journal of Lightwave Technology, vol. 14, No. 6, Jun. 1996.

Maher Ali et al, "Cost-Effective Implementation of Multicasting in Wavelength-Routed Networks" Journal of Lightwave Technology, vol. 18, No. 12, Dec. 2000.

* cited by examiner

PHOTONIC CROSS-CONNECTOR SYSTEM, WDM SYSTEM USING THE SAME PHOTONIC CROSS-CONNECTOR, AND OPTICAL COMMUNICATION NETWORK BASED ON THE SAME WDM SYSTEM

CROSS-REFERENCE TO RELATED PATENT APPLICATION

This application claims the benefit of Korean Patent Application No. 10-2006-0096456, filed on Sep. 29, 2006, in the Korean Intellectual Property Office, the disclosure of which is incorporated herein in its entirety by reference.

BACKGROUND OF THE INVENTION

1. Field of the Invention

The present invention relates to an optical communication, and more particularly, a photonic cross-connector system connecting paths of wavelength division multiplexing (WDM) signals, a WDM system using the photonic cross-connector system, and an optical communication network based on the WDM system.

2. Description of the Related Art

Recent information communication user environments have been suddenly ubiquitous. Thus, information society-based networks have been developed from existing fixed forms to variable forms. In addition, inventions of network node apparatuses have been increased to simply install, operate, and maintain network apparatuses. These apparatuses may be realized through a minimization of an optical-to-electric-to-optical transformation, efficiency of routing and wavelength allocation, optical switching and branching/coupling of channels of a control system.

Figure 1:
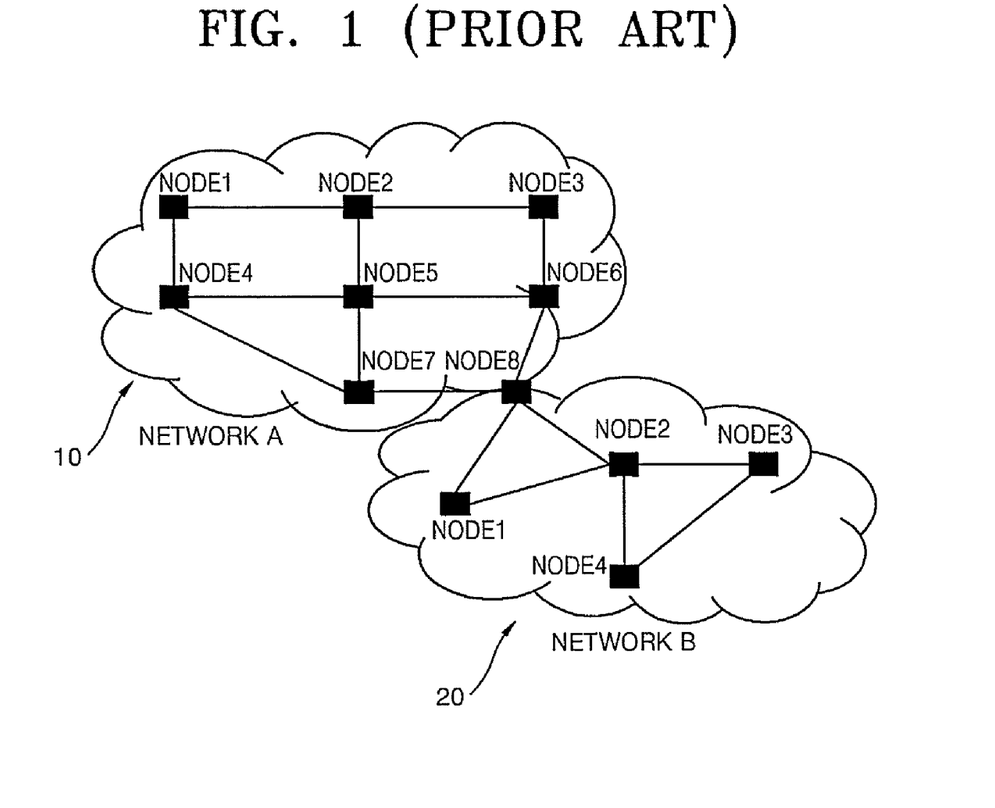
FIG. 1 is a schematic view illustrating a wavelength division multiplexing (WDM) optical network.

FIG. 1 is schematic view illustrating a wavelength division multiplexing (WDM) optical communication network. Referring to FIG. 1, the WDM optical communication network may include a plurality of networks having different physical characteristics such as a used wavelength and a modulation method, i.e., a network A 10 and a network B 20. A node used inside a network having the same physical characteristic, i.e., a photonic cross-connector system, requires a switching function of transmitting signals input from different ports to a desired output port. When a signal of a network having a different physical characteristic, i.e., the network A 10, is connected to the network B 20, a node at a boundary between the networks A and B 10 and 20 requires a wavelength transformation, an optical reproduction, a change of a modulation method, etc. A node 8 shown in FIG. 1 must perform such a function.

There is increased a demand for a multicasting method by which a signal generated in a departure is simultaneously transmitted to a plurality of destinations with the arrival of an Internet protocol television (IP-TV), a teleconference, a virtual private network (VPN), etc. In the multicasting method, a plurality of signals are not generated in a departure and not transmitted to a plurality of destinations. However, a signal is generated and then transmitted a predetermined distance through a common path and diverges from a divergence node to each destination. Thus, traffic of the optical communication network can be reduced.

For example, when a signal generated by a node 1 of the network A 10 is to be simultaneously transmitted to nodes 6 and 7, the signal is first transmitted through nodes 1, 4, and 5 and then copied and diverged from the node 5 into the nodes 6 and 7. Since an existing optical communication network through which an IP signal is transmitted does not provide a switching function, such multicasting is performed by an electrical IP router. Thus, a minimization of an optical-to-electric-to-optical transformation and efficiency of routing and wavelength allocation cannot be realized.

There is suggested a photonic cross-connector system which divides signals input through an optical fiber according to each wavelength, transmits the same wavelength of various wavelengths divided from different optical fibers to a switch, switches the wavelength according to each path, and transmits the wavelength. However, such a photonic cross-connector system does not perform an optical multicasting function and a modulation method conversion function. There is suggested a photonic cross-connector system which realizes a switch switching the same wavelengths to different paths to support a multicasting function with a split and delivery (SaD) including a plurality of optical couplers, a gate optical switch, and a 1:N optical switch. However, the photonic cross-connector system uses optical couplers, wherein the number of optical couplers is equal to the number of wavelengths. Thus, loss is very large, and a large number of optical switches must be used. Also, like the previously described photonic cross-connector system, the present photonic cross-connector system does not provide a function of multicasting to different wavelengths and a function of transforming a modulation method.

There is suggested a photonic cross-connector system which divides an input signal to two paths using a coupler, connects the one of the two paths to a drop path and the other one to a transmission path, and disallows the signal to be transmitted to the transmission path using a wavelength blocker or simultaneously transmits the signal to the drop and transmission paths so as to perform a multicasting function. However, the photonic cross-connector system limits each of input and output ports and does not provide a function of multicasting to different wavelengths and a function of transforming a modulation method.

An optical signal is frequently deteriorated during its transmission due to a chromatic dispersion of an optical fiber, a polarization mode dispersion, noise of an optical amplifier, etc. Thus, each node, i.e., a photonic cross-connector system, requires a function of regenerating a signal, transforming the signal into a clear signal, and transmitting the clear signal to a destination port.

SUMMARY OF THE INVENTION

The present invention provides a photonic cross-connector system capable of performing optical multicasting to switch a wavelength from a random input port to an output port or branch or copy a wavelength from an input port to a plurality of output ports and regenerating a deteriorated signal into a clear signal.

The present invention also provides a wavelength division multiplexing (WDM) system using the photonic cross-connector system to regenerate a deteriorated signal so as to generate a signal from which noise has been removed, transforming a wavelength to prevent a collision between different wavelengths so as to increase network efficiency, and changing a modulation method without a photoelectric transformation when different networks are connected to each other, and an optical communication network based on the WDM system.

According to an aspect of the present invention, there is provided a photonic cross-connector system including: an optical coupler branching an input optical signal into a plurality of paths; a wavelength selective switch (WSS) extracting at least one wavelength signal from the input optical signal and outputting the extracted wavelength signal to at least one port; a WDM multicasting apparatus simultaneously copying and reproducing the input optical signal into different wavelengths and changing modulation methods of the input optical signal into different types of modulation methods; an optical transmitter and/or receiver branching and coupling the input optical signal; and a control system controlling the optical coupler, the WSS, the WDM multicasting apparatus, and the optical transmitter and/or receiver.

According to another aspect of the present invention, there is provided a WDM system using the photonic cross-connector system.

According to another aspect of the present invention, there is provided a WDM optical communication network formed based on the WDM system.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

FIGS. 2A and 2B, and FIGS. 3A through 3D are block diagrams and a graph illustrating basic functions of photonic cross-connector systems according to embodiments of the present invention. FIGS. 2A through 3D are introduced to simply describe a basic structure of a photonic cross-connector system of the present invention before the detailed structure of the photonic cross-connector system is described.

Figure 2A:
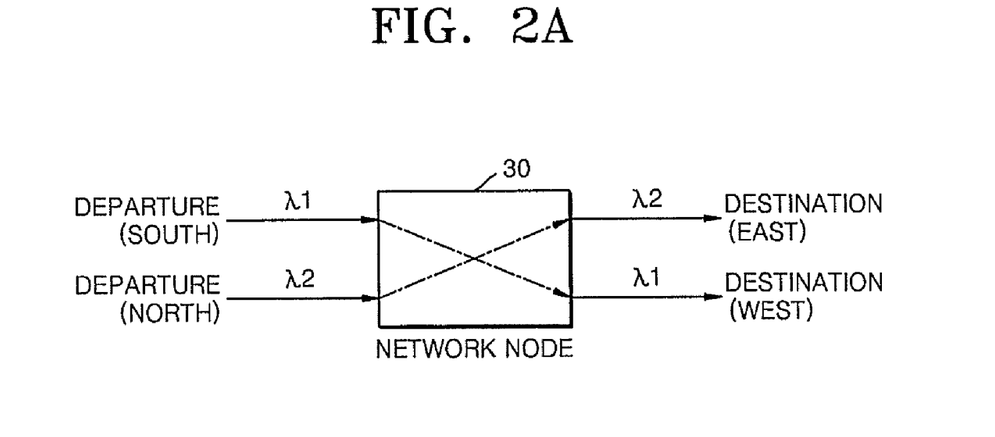
FIGS. 2A and 2B are block diagrams illustrating switching functions of photonic cross-connector systems according to embodiments of the present invention.
Figure 2B:
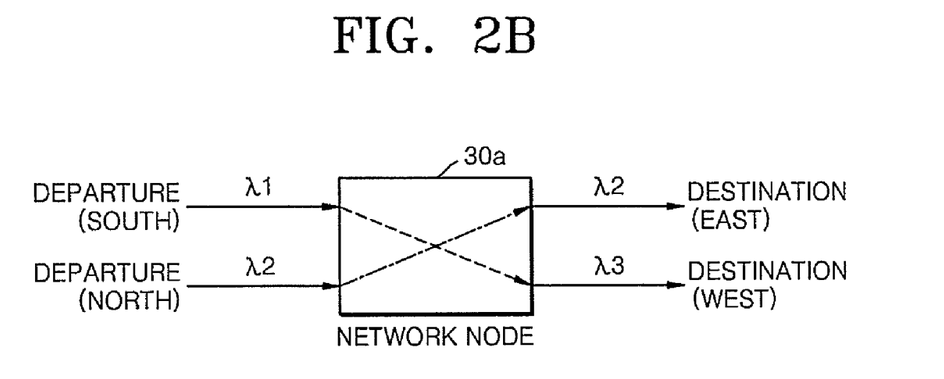

FIGS. 2A and 2B are block diagrams illustrating switching functions of photonic cross-connector systems according to embodiments of the present invention. Here, the switching functions are the most basic functions of the photonic cross-connector systems used in a network.

Referring to FIG. 2A, a network node 30, i.e., a photonic cross-connector system, switches a signal of a first wavelength $\lambda 1$ input from a south port to a west port and a signal of a second wavelength $\lambda 2$ input from a north port to an east port.

Referring to FIG. 2B, a network node 30a switches a signal of a first wavelength $\lambda 1$ input from a south port to a west port and transforms the first wavelength $\lambda 1$. In other words, the network node 30a transforms the first wavelength $\lambda 1$ into a third wavelength $\lambda 3$ and then outputs the signal of the third wavelength $\lambda 3$ to the west part. In this case, the first wavelength $\lambda 1$ has been already used in a path of the south port. Thus, the photonic cross-connector system requires such a wavelength transformation function to prevent a wavelength collision.

FIGS. 3A through 3D are block diagrams and a graph illustrating optical multicasting functions of photonic cross-connector systems according to embodiments of the present invention. Such a multicasting function contributes to reducing traffic in a network or between different networks so as to further efficiently transmit a signal.

Figure 3A:
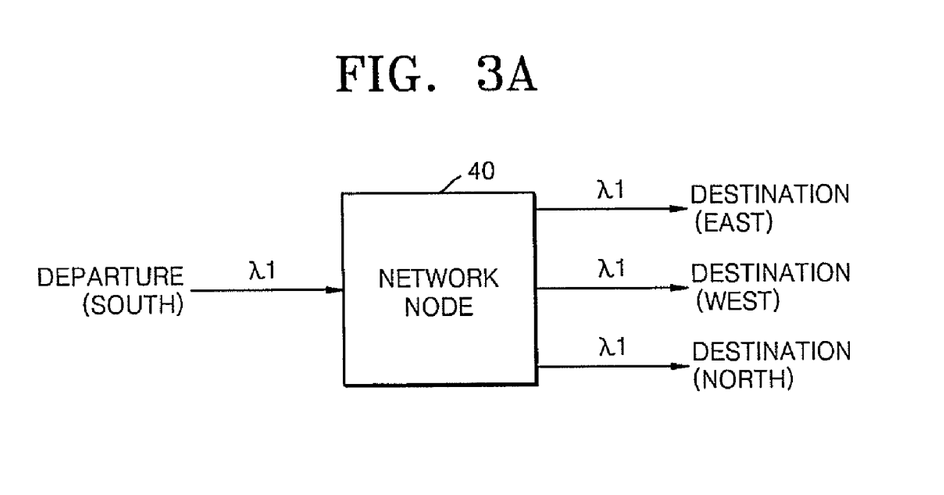
FIGS. 3A through 3D are block diagrams illustrating optical multicasting functions of photonic cross-connector systems according to embodiments of the present invention.

Referring to FIG. 3A, a network node 40, i.e., a photonic cross-connector system, copies an optical signal of a first wavelength $\lambda 1$ input from a south port into a plurality of identical wavelengths, i.e., a plurality of first wavelengths $\lambda 1$, and then outputs the plurality of wavelengths to different destination ports such as east, west, and north ports.

Figure 3B:
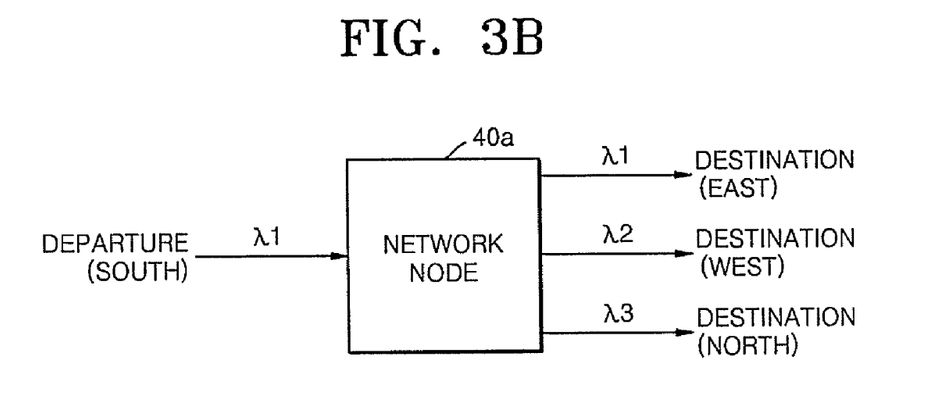

Referring to FIG. 3B, a network node 40a copies a plurality of identical wavelengths to a first wavelength $\lambda 1$ input from a south port and transforms a plurality of identical wavelengths into a plurality of different wavelengths, i.e., first, second, and third wavelengths $\lambda 1$, $\lambda 2$, and $\lambda 3$, and then outputs the first, second, and third wavelengths $\lambda 1$, $\lambda 2$, and $\lambda 3$.

Figure 3C:
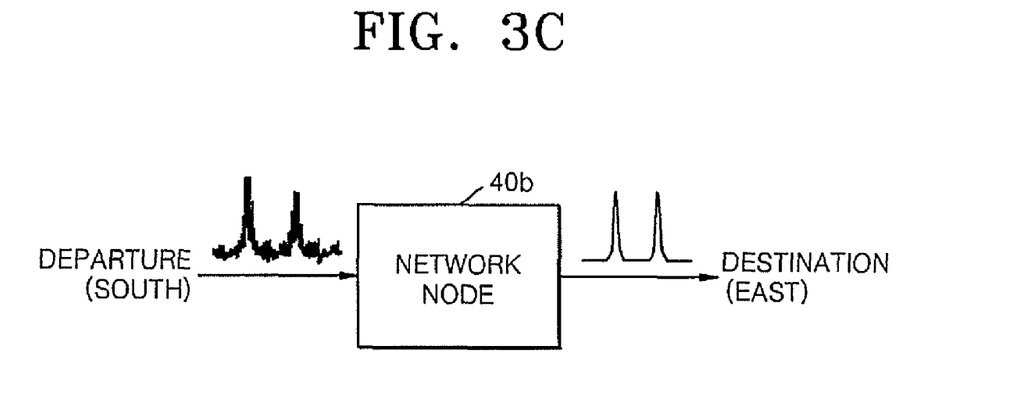

Referring to FIG. 3C, a network node 40b reproduces a signal, which has been deteriorated during its transmission, as a clear signal and then outputs the clear signal to a destination port. In other words, an optical signal is generally deteriorated due to a chromatic dispersion of an optical fiber, a polarization mode dispersion, noise of an optical amplifier, etc. As a result, a photonic cross-connector system requires a function of regenerating a deteriorated optical signal as a clear signal.

Figure 3D:
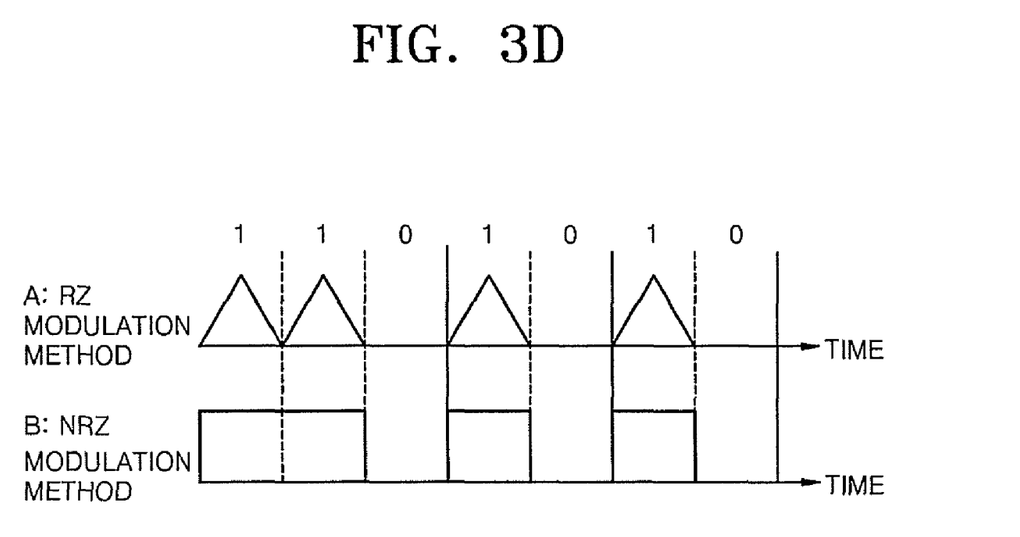

FIG. 3D is a graph illustrating two methods of modulating a signal. An upper graph A illustrates a return-to-zero (RZ) modulation method, and a lower graph B illustrates a Non-Return-to-Zero (NRZ) modulation method. In general, networks having different physical characteristics, i.e., the network A 10 and the network B 20 shown in FIG. 1, use different modulation methods. A photonic cross-connector system must perform a modulation method transformation function for an optical transmission performed between the networks. In addition, the photonic cross-connector system requires a wavelength transformation function or an optical regeneration function of a new signal as illustrated in FIG. 3B or 3C. For example, the node 8 shown in FIG. 1 must perform these functions.

A photonic cross-connector system of the present invention must perform functions illustrated in FIGS. 2A through 3D and will now be described in detail.

Figure 4:
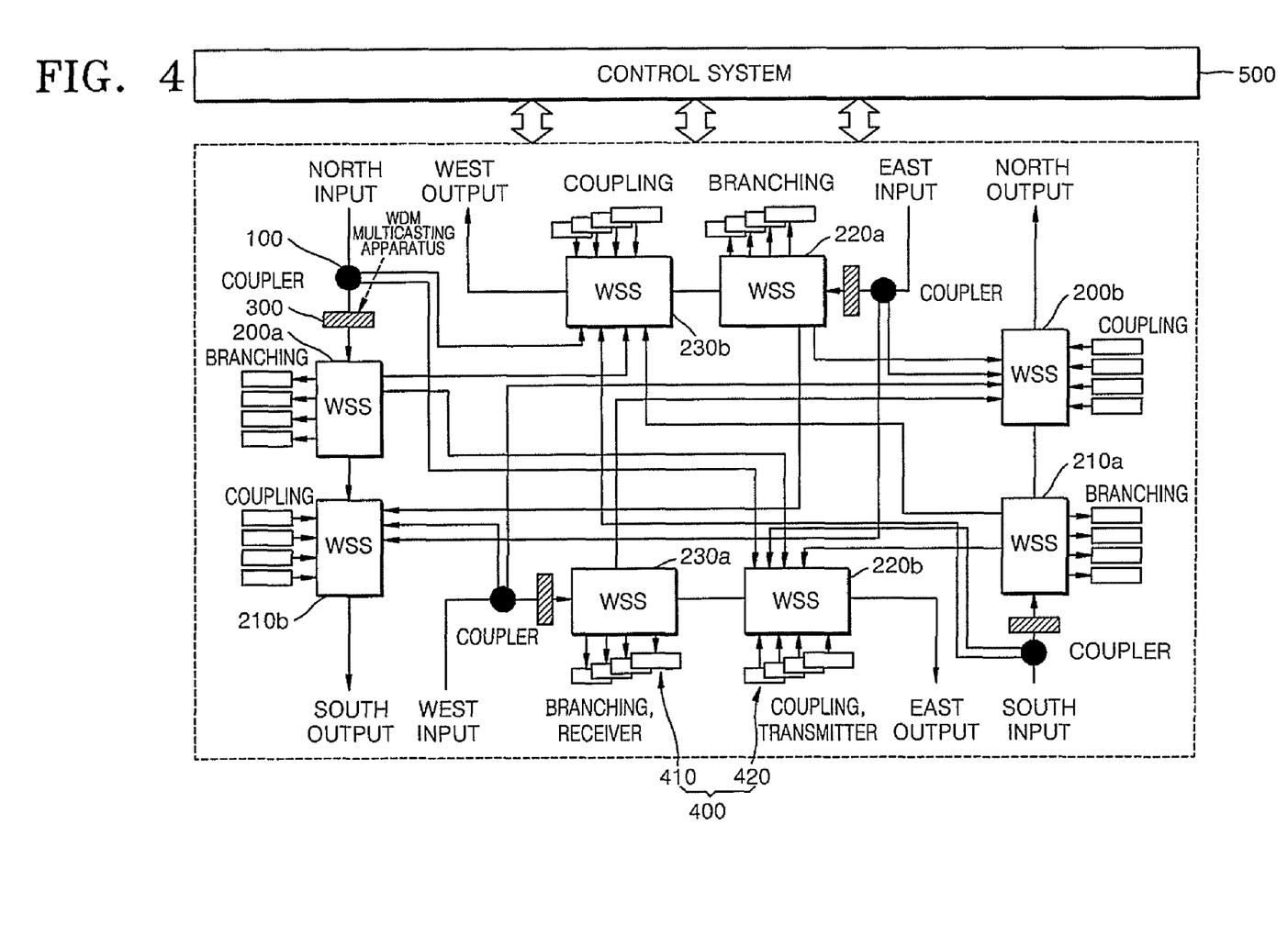
FIG. 4 is a block diagram illustrating a photonic cross-connector system having an optical multicasting function according to an embodiment of the present invention.

FIG. 4 is a block diagram illustrating a photonic cross-connector system having an optical multicasting function according to an embodiment of the present invention. Referring to FIG. 4, the photonic cross-connector system includes optical couplers 100, wavelength selective switches (WSSs), WDM multicasting apparatuses 300, optical transmitters and/or receivers 400, and a control system 500. Each of the optical couplers 100 branches an input optical signal into a plurality of paths. Each of the WSSs extracts at least one wavelength signal from an input signal and transmits the at least one wavelength signal to at least one port. Each of the WDM multicasting apparatuses 300 simultaneously copies and regenerates an input signal as different wavelength signals and transforms the different wavelengths signals using different modulation methods. The optical transmitters and/or receivers 400 branch and couple signals. The control system 500 controls the optical couplers, the WSSs, the WDM multicasting apparatuses 300, and the optical transmitters and/or receivers 400.

The photonic cross-connector system of the present embodiment has a function of switching a signal input from an input port to three different destination ports. The function of the photonic cross-connector system will now be described in brief. A WDM signal input from a north input port branches into three paths through the optical coupler 100 and then transmitted to the north branching WSS 200a, the west coupling WSS 230b, and the east coupling WSS 220b. The signal to be transmitted to the north branching WSS 200a is transmitted to the north branching WSS 200a through the WDM multicasting apparatus 300.

Here, a WSS is an apparatus which selects a random wavelength and transmits the random wavelength to a random port, i.e., transmits a single wavelength or a plurality of wavelengths to a port. Also, the WSS may adjust an intensity of an input signal according to each wavelength and determine blocking and a transmission of a signal. Thus, the WSS may branch or couple a signal to a transmitter and/or receiver and transmit the signal to a desired WSS.

The north branching WSS 200a branches a wavelength to a branching receiver according to a command of the control system 500 and transmits other channel signals to the south coupling WSS 210b, the west coupling WSS 230b, and the east coupling WSS 220b according to predetermined destinations. The south coupling WSS 210b transmits only signals of a signal connected to a coupling transmitter, a signal connected to the north branching WSS 220a through a wavelength transformation or a simple branch and/or copy, and a signal connected to the east and west input couplers 100 through a simple branch and/or copy, and a signal connected to the east branching WSS 220a through a multi-wavelength copy or an optica regeneration I to output ports according to a command of the control system 500, wherein the only signals are set to be output to a south direction, and blocks the other signals.

A process of inputting a signal from a north input port and then transmitting the signal to a south output port has been described in brief. However, a signal may be input from any one of east, west, south, and north directions and output to each of the east, west, south, and north directions according to the above-described principle. In other words, a signal may be input from any direction, and a signal or a plurality of signals may be output to a specific port or to a plurality of ports. The coupling WSSs 200b, 210b, 220b, and 230b transmit only set signals to output ports, respectively, and block other signals during an output to each port.

In the photonic cross-connector system of the present embodiment, each of the optical couplers 100 performs a multicasting function of simultaneously copying and/or branching an identical wavelength as illustrated in FIG. 3A. Each of the WDM multicasting apparatuses 300 and the branching WSSs 200a, 210a, 220a, and 230a performs a multicasting function of simultaneously copying and/or branching a wavelength into a plurality of different wavelengths as illustrated in FIG. 3B.

Figure 5:
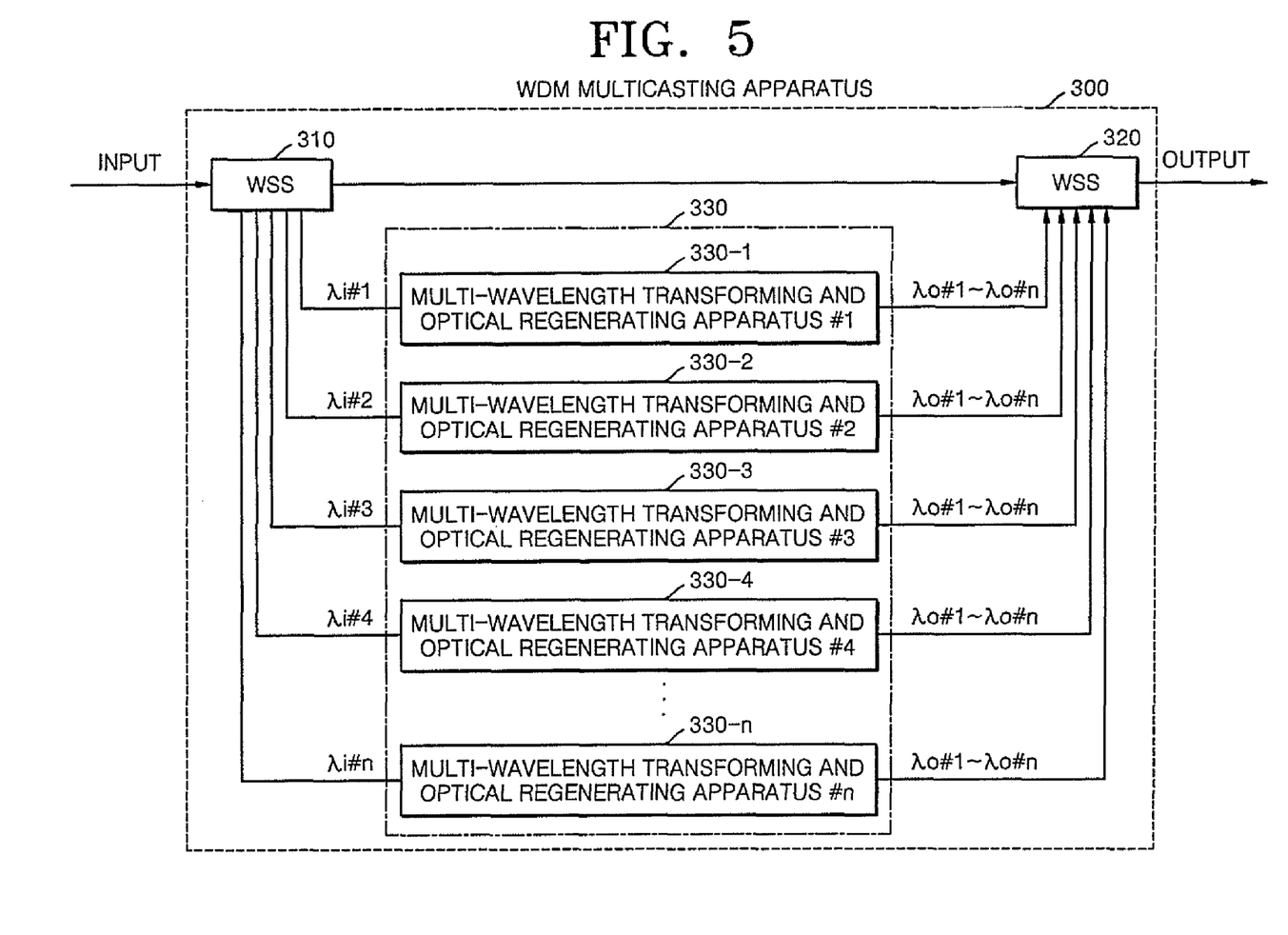
FIG. 5 is a detailed block diagram illustrating a WDM multicasting apparatus illustrated in FIG. 4.

FIG. 5 is a detailed block diagram illustrating the WDM multicasting apparatus 300 illustrated in FIG. 4. Referring to FIG. 5, the WDM multicasting apparatus 300 includes an input WSS 310, an output WSS 320, and at least one or more multi-wavelength transforming and optical regenerating apparatuses 330. The WDM multicasting apparatus 300 transmits a signal, which does not need to be wavelength transformed or optical regenerated, from the input WSS 310 to the output WSS 320 but switches a signal, which is required to be wavelength transformed or optical regenerated, to a path to which the multi-wavelength transforming and optical reproducing apparatuses 330 are connected. Each of the multi-wavelength transforming and optical regenerating apparatuses 330 copies an input wavelength into a wavelength or a plurality of different wavelengths and outputs the wavelength or the plurality of different wavelengths to the output WSS 320 and has optical regenerating and modulation method transforming functions.

Figure 6:
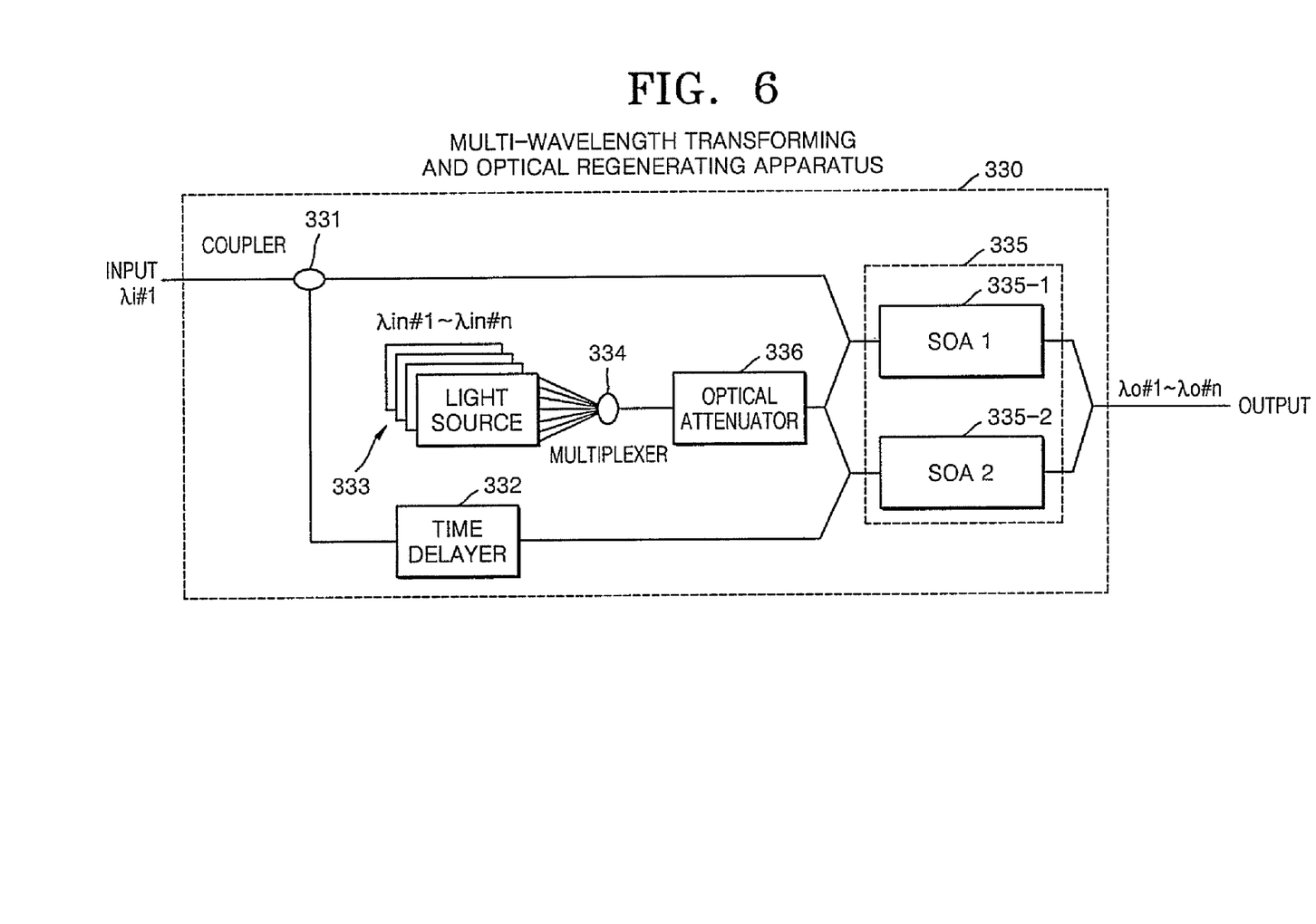
FIG. 6 is a detailed block diagram illustrating a multi-wavelength transforming and optical regenerating apparatus illustrated in FIG. 5.

FIG. 6 is a block diagram illustrating the multi-wavelength transforming and optical regenerating apparatus 330 illustrated in FIG. 5. Referring to FIG. 6, the multi-wavelength transforming and optical regenerating apparatus 330 includes an optical coupler 331, a time delayer 332, WDM light sources 333, a multiplexer 334, and a Mach-Zehnder interference semiconductor optical amplifier (SOA) 335. The optical coupler 331 splits an input signal. The time delayer 332 delays one of the signals split by the optical coupler 331 for a predetermined period of time and outputs the signal. The WDM light sources 333 generate a plurality of wavelength signals. The multiplexer 334 combines the plurality of wavelength signals output from the WDM light sources 333. The Mach-Zehnder interference SOA 335 receives the split input signals and a signal output from the multiplexer 334. Here, the Mach-Zehnder interference SOA 335 has a dual-arm structure in which two arms shift phases.

A function of the multi-wavelength transforming and optical reproducing apparatus 330 will now be described in brief. A signal of a single wavelength $\lambda_{i\#1}$ is divided into two signals through the optical coupler 331, and then one of the two signals is input to a Mach-Zehnder interferometer SOA 335-1, and the other one is input to a Mach-Zehnder interferometer SOA 335-2 through the time delayer 332. A signal of the WDM light source 333 having a plurality of wavelengths $\lambda_{in\#1}$ through $\lambda_{in\#n}$ are combined into a path using the multiplexer 334 and input to the Mach-Zehnder interferometer SOAs 335-1 and 335-2 through an optical attenuator 336 and a Mach-Zehnder interference central path. Here, a signal output from the WDM light sources 333 has a continuous wave form or a pulse form.

The signal of the single wavelength $\lambda_{i\#1}$ input to the Mach-Zehnder interferometer SOA 335 changes a carrier density in the Mach-Zehnder interferometer SOA 335 so as to induce phase shifts Φ of the plurality of wavelengths $\lambda_{in\#1}$ through $\lambda_{in\#n}$ input from the WDM light sources 333. Since a difference of phase shifts between wavelengths is small in the Mach-Zehnder interferometer SOA 335, the same phase shift may be induced to a plurality of wavelengths. The signal having passed the time delayer 332 is delayed for a delay time τ to induce the phase shifts Φ of the plurality of wavelengths $\lambda_{in\#1}$ through $\lambda_{in\#n}$. The signal of the single wavelength $\lambda_{i\#1}$ is removed using a filter or the like, and thus a signal having a plurality of wavelengths $\lambda o_{\#1}$ through $\lambda o_{\#n}$ is output as an output signal.

FIGS. 7A through 7E are graphs illustrating phase shift patterns and input and output waveforms generated by the Mach-Zehnder interferometer SOA 335 of the multi-wavelength transforming and optical reproducing apparatus 330 illustrated in FIG. 6.

Figure 7A:
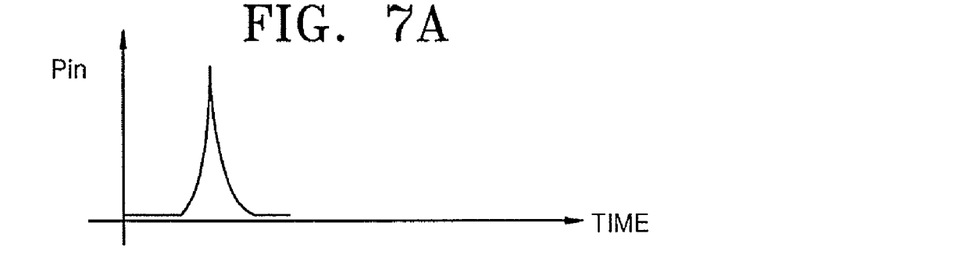
FIGS. 7A through 7E are graphs illustrating phase shift patterns and input and output waveforms generated by a Mach-Zehnder interference semiconductor optical amplifier (SOA) of the multi-wavelength transforming and optical regenerating apparatus illustrated in FIG. 6.
Figure 7B:
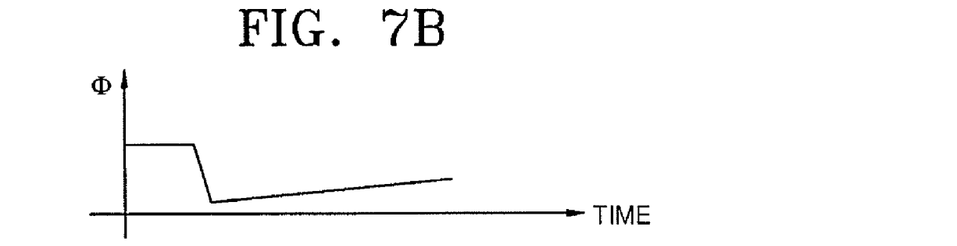

FIG. 7A is a graph illustrating a pulse form wavelength generated by the WDM light source 333. Here, a horizontal axis denotes a time, and a vertical axis denotes an input optical power $P_{in}$. FIG. 7b is a graph illustrating a signal of which phase has been shifted through a Mach-Zehnder interferometer. Here, a horizontal axis denotes a time, and a vertical axis denotes a phase $\Phi$.

Figure 7C:
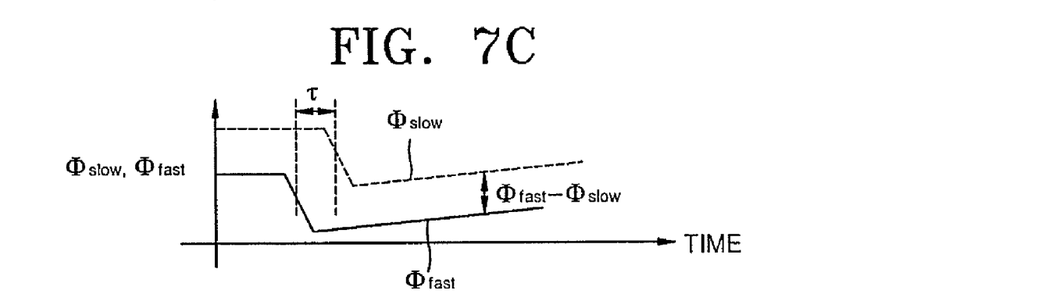

FIG. 7C is a graph illustrating fast and slow phase shift parts of a signal which have been shifted through a Mach-Zehnder interferometer. Here, the fast and slow phase shift parts are denoted by $\Phi_{fast}$ and $\Phi_{slow}$. The slow phase shift part $\Phi_{slow}$ is shifted with a delay time $\tau$ to the fast phase shift part $\Phi_{fast}$. Signals of which phases are shifted at different delay times are combined at an output port of a Mach-Zehnder interferometer and destructively interfered. Thus, when an output is represented as an intensity, i.e., an optical power, a difference between phase shift patterns is reflected on the output. Here, a form of the output depends on the delay time $\tau$.

Figure 7D:
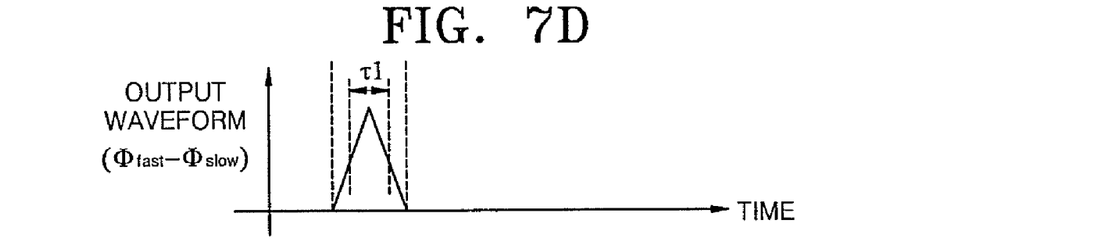

FIG. 7D is a graph illustrating an output waveform $\Phi_{fast}-\Phi_{slow}$ when a delay time $\tau$ is smaller than a bit rate of an input digital signal. Here, a vertical axis denotes a unit of an optical power. If the delay time $\tau$ is smaller than the bit rate of the input digital signal, and an RZ modulation signal is input, the RZ modulation signal is output.

Figure 7E:
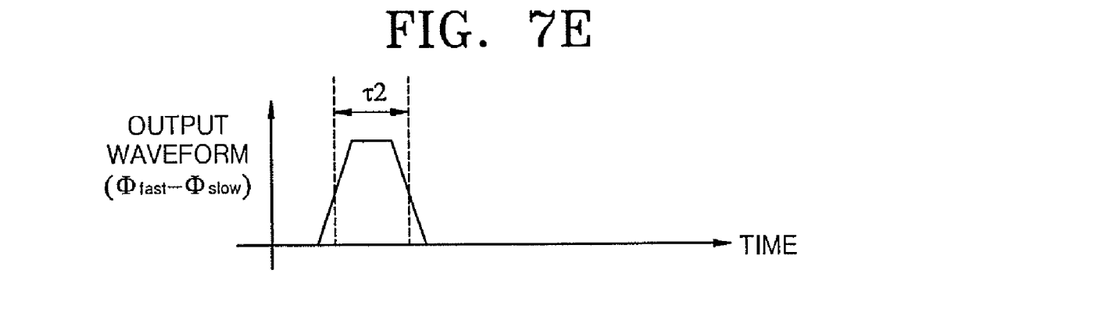

FIG. 7E is a graph illustrating an output waveform $\Phi_{fast}-\Phi_{slow}$ when a delay time $\tau$ is equal to a bit rate of an input signal. If an RZ modulation signal is input in this case, a signal, which has been transformed to an NRZ modulation method, is output. In other words, a modulation method of the input signal is changed. As a result, the delay time $\tau$ may vary to vary the output waveform $\Phi_{fast}-\Phi_{slow}$.

A phase shift pattern is formed non-linearly to an intensity of an input signal with a constant threshold. Thus, the multi-wavelength transforming and optical regenerating apparatus 300 may reduce intensity noise of a digital signal. Also, if a signal of a WDM light source is a pulse, and a light source synchronizing with the pulse input to the WDM light source, timing noise may be reduced.

A laser may be turned on and/or off to adjust a number of WDM light sources input to a Mach-Zehnder interferometer according to a command of the control system 500. An optical power of a light source input to the Mach-Zehnder interference may be maintained constant using an optical attenuator. The process of using an RZ modulation method as it is or changing the RZ modulation method into an NRZ modulation method has been described with reference to FIGS. 7A through 7E. However, this is only an example. Thus, the NRZ modulation method may be used as it is or may be changed in to the RZ modulation method.

Figure 8A:
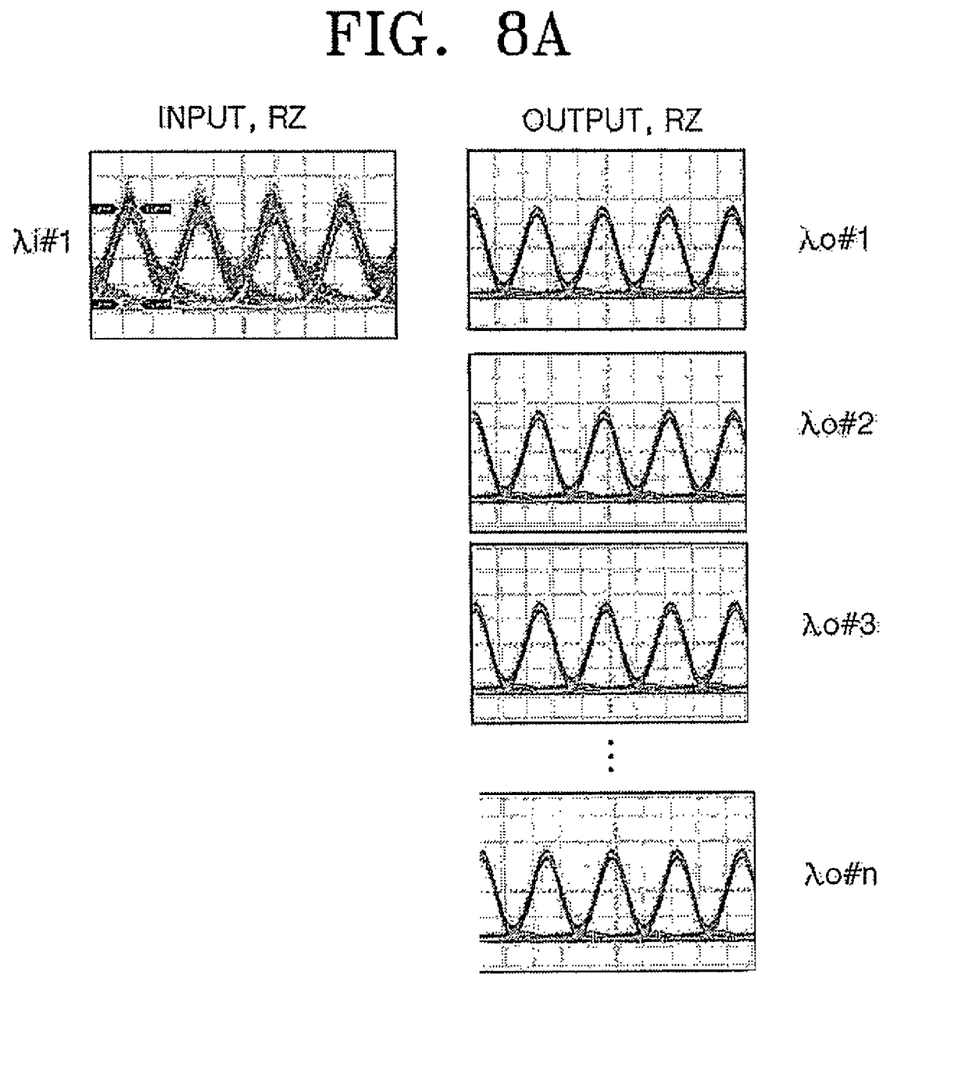
FIGS. 8A through 8C are graphs illustrating waveforms which are copied to a plurality of different wavelengths and of which modulation methods have been transformed through the multi-wavelength transforming and optical regenerating apparatus of FIG. 7.
Figure 8B:
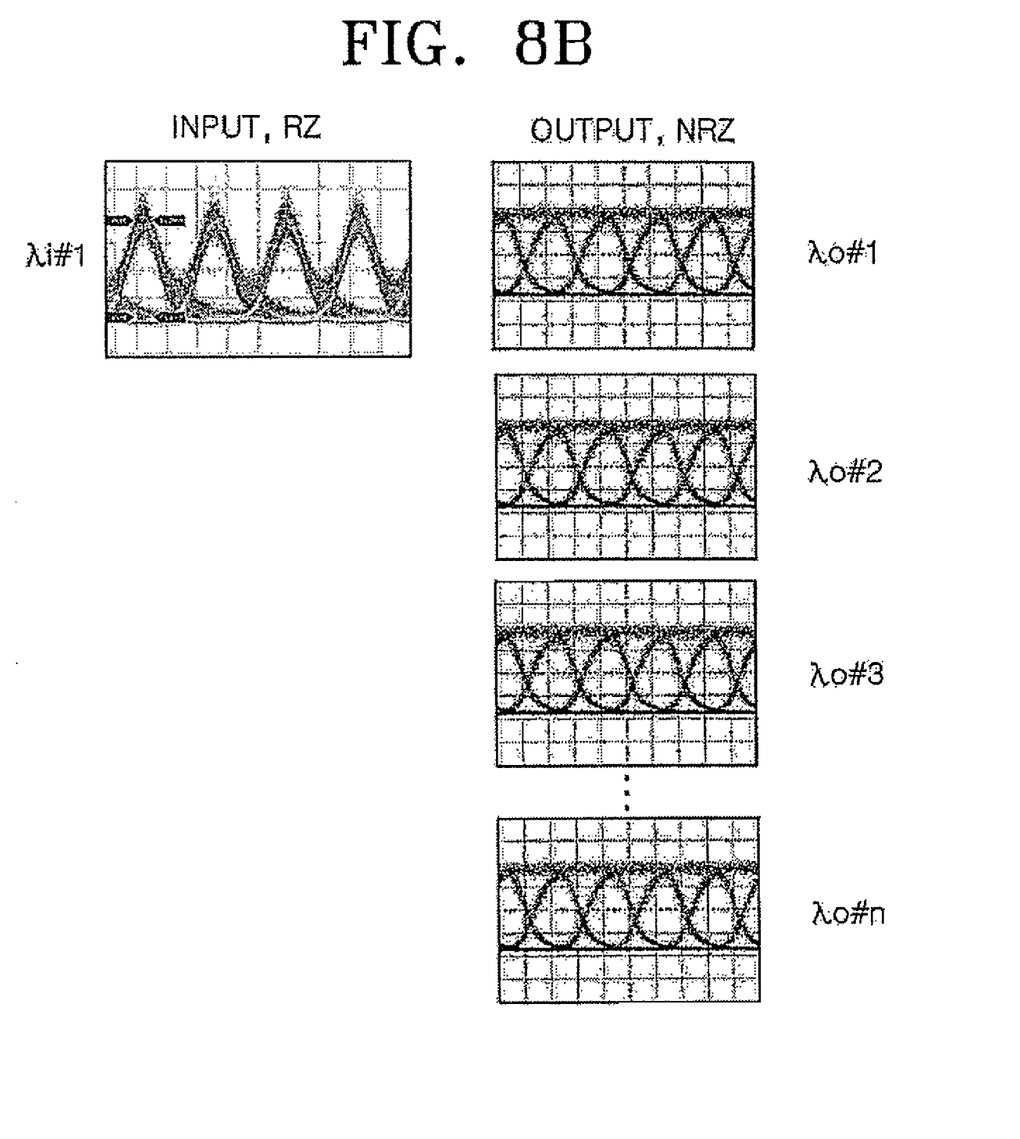
Figure 8C:
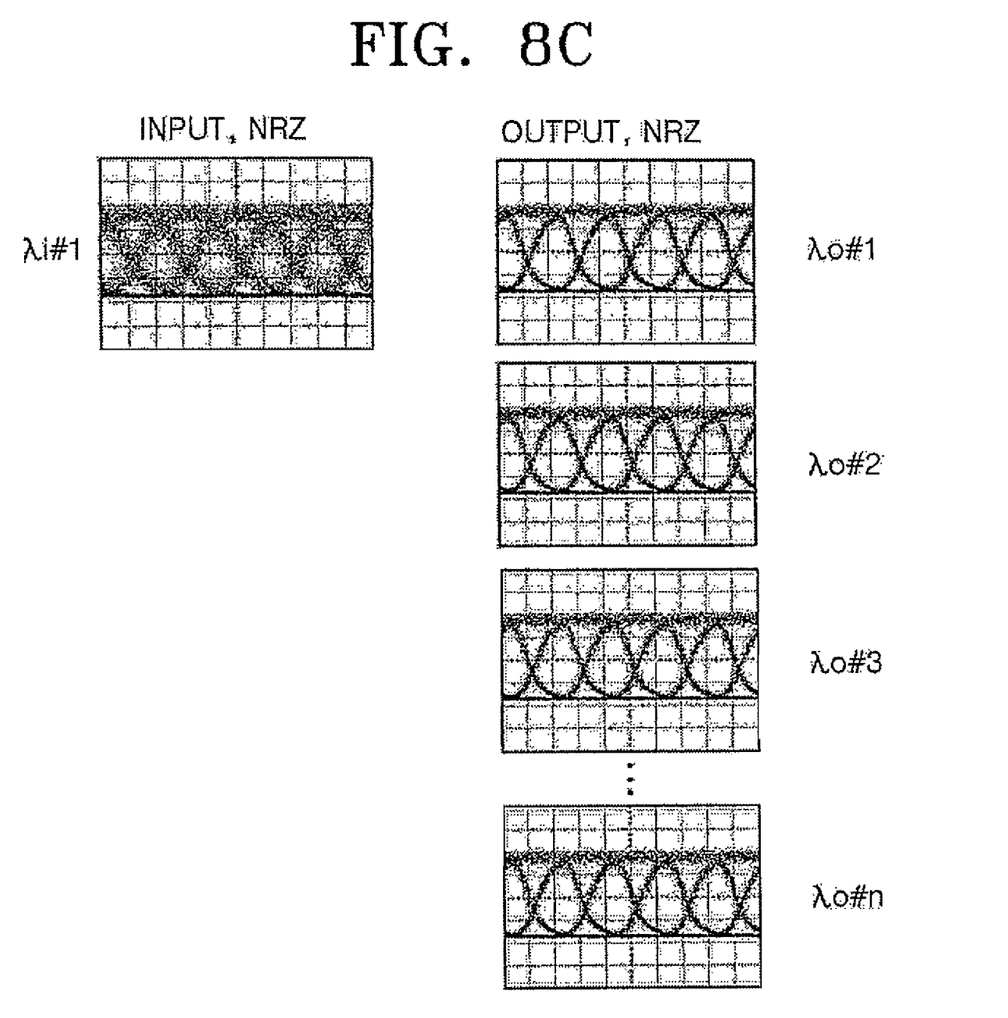

FIGS. 8A through 8C are graphs illustrating waveforms which are copied to a plurality of different wavelengths and of which modulation methods are transformed through the multi-wavelength transforming and optical reproducing apparatus 330 of FIG. 7.

FIG. 8A is a graph illustrating an input wavelength signal which has an RZ modulation method and is simultaneously copied and output into a plurality of wavelengths. FIG. 8B is a graph illustrating an input wavelength signal of which RZ modulation method is transformed into an NRZ modulation method and which is simultaneously copied and output into a plurality of wavelengths. FIG. 8C is a graph illustrating an input wavelength signal which has an NRZ modulation method and is simultaneously copied and output into a plurality of wavelengths.

As shown in FIGS. 8A through 8C, output signals having more considerably reduced noises than input signals are generated. In other words, a multi-wavelength transforming and optical regenerating apparatus reduces intensity noise from a digital signal.

As described above, a photonic cross-connector system of the present invention can perform an optical multicasting function of switching a wavelength from an input port to an output port or branching or copying the wavelength from an input port into a plurality of output ports. The photonic cross-connector system can perform a function of regenerating a deteriorated signal to a clear signal.

The photonic cross-connector system having such functions can be used in a WDM system, and an optical communication network including the WDM system can be established. Thus, an optical signal can be accurately transmitted, and a collision between different wavelengths can be prevented through a wavelength transformation to increase efficiency of the optical communication network. In addition, when networks having different modulation methods are connected to each other, the different modulation methods can be easily changed without a photoelectric transformation. Also, multicasting can be performed on an optical signal layer. Thus, a network apparatus can be easily installed, operated, and maintained compared to an existing optical communication network.

As described above, a photonic cross-connector system according to the present invention can perform an optical multicasting function of switching a wavelength from an input port to an output port or branching or copying a wavelength from an input port to a plurality of output ports. The photonic cross-connector system can also regenerate a deteriorated signal into a clear signal.

In addition, a WDM system and an optical communication network including the WDM system according to the present invention can use the photonic cross-connector system to accurately transmit an optical signal. Also, a collision between different wavelengths can be prevented through a wavelength transformation to increase efficiency of the optical communication network. In addition, when networks having different modulation methods are connected to each other, the different modulation methods can be easily changed without a photoelectric transformation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photonic cross-connector system comprising:
   an optical coupler branching an input optical signal into a plurality of paths;
   a WSS (wavelength selective switch) extracting at least one wavelength signal from the input optical signal and outputting the extracted wavelength signal to at least one port;
   a WDM (wavelength division multiplexing) multi-casting apparatus simultaneously copying and regenerating the input optical signal into different wavelengths and changing modulation methods of the input optical signal into different types of modulation methods;
   an optical transmitter and/or receiver branching and coupling the input optical signal; and a control system controlling the optical coupler, the WSS, the WDM multicasting apparatus, and the optical transmitter and/or receiver
wherein the WSS is divided into a branching WSS and a coupling WSS, and the WDM multicasting apparatus is disposed between the optical coupler and the branching WSS.

2. The photonic cross-connector system of claim 1, wherein the optical coupler copies and branches the input optical signal into a signal having an identical wavelength to the input optical signal, and the WDM multicasting apparatus and the branching WSS copy and branch the input optical signal into a plurality of different wavelengths, so that the photonic cross-connector system performs a multicasting function.

3. The photonic cross-connector system of claim 1, wherein numbers of optical couplers, WSSs, and WDM multicasting apparatuses are increased to increase numbers of input and output ports of the photonic cross-connector system.

4. The photonic cross-connector system of claim 1, wherein the WSS blocks the input optical signal or adjusts the optical signal on an appropriate power level and then transmits the optical signal to another WSS or another port.

5. The photonic cross-connector system of claim 1, wherein the WDM multicasting apparatus comprises an input WSS, an output WSS, and at least one multi-wavelength transforming and optical regenerating apparatus, wherein a signal input to the input WSS is directly transmitted to the output WSS or transmitted to the output WSS through the multi-wavelength transforming and optical regenerating apparatus.

6. The photonic cross-connector system of claim 5, wherein the multi-wavelength transforming and optical regenerating apparatus comprises:
an optical coupler dividing an input signal;
a time delayer delaying one of the signals divided by the optical coupler for a predetermined period of time and then outputting the delayed signal;
a WDM light source generating a plurality of wavelength signals;
a multiplexer combining the plurality of wavelength signals output from the WDM light source; and
a Mach-Zehnder interferometer SOA (semiconductor optical amplifier) receiving the divided input signals and a signal output from the multiplexer.

7. The photonic cross-connector system of claim 6, wherein the multi-wavelength transforming and optical regenerating apparatus comprises an optical attenuator disposed between the multiplexer and the Mach-Zehnder interferometer SOA to maintain a power of the signal output from the multiplexer, and the Mach-Zehnder interferometer SOA has a dual arm structure, wherein the divided input signals are respectively input to arms of the Mach-Zehnder interference SOA, and an output of the optical attenuator is divided and input to the arms of the Mach-Zehnder interferometer SOA.

8. The photonic cross-connector system of claim 7, wherein the Mach-Zehnder interferometer SOA copies an input signal into a plurality of output wavelengths having identical modulation methods to the input signal or into a plurality of output wavelengths having different modulation methods from the input signal.

9. The photonic cross-connector system of claim 8, wherein the input signal is one of RZ (return-to-zero) and NRZ (non-return to zero) modulation signals, and if the input signal is the RZ modulation signal, the predetermined period of time is $\tau$, and the predetermined period of time $\tau$ is smaller than a bit rate of the input signal, a an RZ modulation signal is output from the Mach-Zehnder interferometer SOA, and if the predetermined period of time $\tau$ is equal to the bit rate of the input signal, an NRZ modulation signal is output from the Mach-Zehnder interferometer SOA.

10. The photonic cross-connector system of claim 7, wherein a laser is turned on and/or off to adjust a number of WDM light sources input to the Mach-Zehner interference SOA according to a command of the controls system so as to adjust a number of output wavelengths, and an entire output power of the light source is maintained constant using the optical attenuator.

11. A WDM system using the photonic cross-connector system of claim 1.

12. A WDM optical communication network formed based on the WDM system of claim 11.

13. A photonic cross-connector system comprising:
an optical coupler configured to branch at least one input signal into a plurality of paths;
a wavelength division multiplexing (WDM) multi-casting apparatus coupled to the optical coupler, the WDM multi-casting apparatus comprising:
an optical divider configured to divide at least one branched input signal from the optical coupler;
a time delayer configured to delay at least one divided input signal from the optical divider and to output a delayed signal;
a WDM light source configured to output a plurality of wavelength signals;
a multiplexer configured to combine the plurality of wavelength signals output from the WDM light source; and
a Mach-Zehnder interferometer SOA (semiconductor optical amplifier) coupled to the multiplexer, to the optical divider and to the time delayer, the Mach-Zehnder interferometer SOA configured to output a plurality of output wavelengths having either identical or different modulations with respect to the divided input signal; and
a WSS (wavelength selective switch) configured to extract at least one wavelength signal from the input optical signal and to output the extracted wavelength signal to at least one port.

14. The photonic cross-connector system of claim 13 further comprising:
an optical transmitter and/or receiver configured to branch and to couple the input optical signal.

15. The photonic cross-connector system of claim 14 further comprising:
a control system configured to control the optical coupler, the WSS, the WDM multicasting apparatus, and the optical transmitter and/or receiver.

16. The photonic cross-connector system of claim 13 wherein the WDM multi-casting apparatus multi-casting apparatus is configured to simultaneously copy and to regenerate the input optical signal into different wavelengths and to change modulation methods of the input optical signal into different types of modulation methods.

17. The photonic cross-connector system of claim 13, wherein, wherein the WSS is configured to block the input optical signal or to adjust the optical signal at an appropriate power level and to then transmit the optical signal to another WSS or another port.

18. The photonic cross-connector system of claim 13, wherein the WSS is divided into a branching WSS and a coupling WSS, and the WDM multicasting apparatus is disposed between the optical coupler and the branching WSS.

19. The photonic cross-connector system of claim 13, wherein the WDM multicasting apparatus comprises an input WSS, an output WSS, wherein a signal input to the input WSS is directly transmitted to the output WSS or transmitted to the output WSS through the optical divider, the time delayer and the Mach-Zehnder interferometer SOA.

20. The photonic cross-connector system of claim 13, comprising an optical attenuator disposed between the multiplexer and the Mach-Zehnder interferometer SOA to maintain a power of the signal output from the multiplexer, and the Mach-Zehnder interferometer SOA has a dual arm structure, wherein the divided input signal is respectively input to arms of the Mach-Zehnder interference SOA, and an output of the optical attenuator is divided and input to the arms of the Mach-Zehnder interferometer SOA.

\* \* \* \* \*